United States Patent
Pokhariyal

(10) Patent No.: US 9,125,099 B2
(45) Date of Patent: Sep. 1, 2015

(54) ACCESS POINT, COMMUNICATION SYSTEM AND METHOD FOR ESTIMATING A PATH LOSS VALUE THEREFOR

(75) Inventor: Akhilesh Pokhariyal, Richmond (GB)

(73) Assignee: IP.ACCESS LIMITED, Cambourne, Cambridge (GB)

( * ) Notice: Subject to any disclaimer, the term of this patent is extended or adjusted under 35 U.S.C. 154(b) by 240 days.

(21) Appl. No.: 13/581,565

(22) PCT Filed: Mar. 1, 2011

(86) PCT No.: PCT/EP2011/052979
§ 371 (c)(1),
(2), (4) Date: Dec. 7, 2012

(87) PCT Pub. No.: WO2011/107453
PCT Pub. Date: Sep. 9, 2011

(65) Prior Publication Data
US 2013/0150066 A1  Jun. 13, 2013

(30) Foreign Application Priority Data

Mar. 3, 2010  (GB) .................................. 1003520.2

(51) Int. Cl.
*H04W 24/00* (2009.01)
*H04W 24/10* (2009.01)
*H04W 52/24* (2009.01)
(Continued)

(52) U.S. Cl.
CPC ............. *H04W 24/10* (2013.01); *H04B 17/318* (2015.01); *H04W 24/00* (2013.01); *H04W 52/24* (2013.01); *H04W 72/085* (2013.01); *H04W 28/04* (2013.01); *H04W 28/18* (2013.01); *H04W 52/143* (2013.01); *H04W 52/242* (2013.01); *H04W 52/244* (2013.01); *H04W 84/045* (2013.01)

(58) Field of Classification Search
USPC ........ 455/456.1–456.6, 418–420, 435.1, 446, 455/448, 423–425, 426.1, 450, 452.1–452.2
See application file for complete search history.

(56) References Cited

U.S. PATENT DOCUMENTS

2009/0042593 A1    2/2009  Yavuz et al.
2009/0042596 A1*   2/2009  Yavuz et al. ................... 455/522
(Continued)

FOREIGN PATENT DOCUMENTS

GB        2450123  A    12/2008
GB        2452688  A    3/2009
(Continued)

OTHER PUBLICATIONS

International Search Report and Written Opinion for PCT/EP2011/052979 issued May 2, 2011.
(Continued)

*Primary Examiner* — Brandon Miller
(74) *Attorney, Agent, or Firm* — Fitch Even Tabin & Flannery LLP

(57) ABSTRACT

A method for estimating a path loss value for a femto cell. The method comprises, at the femto access point of the femto cell, receiving at least one indication of signal strength for at least one neighbor cell from at least one wireless communication unit, analyzing the received at least one indication of signal strength for the at least one neighbo cell to determine at least one location characteristic, and estimating a path loss value for the femto cell based at least partly on the determined at least one location characteristic.

16 Claims, 9 Drawing Sheets

(51) Int. Cl.
*H04W 72/08* (2009.01)
*H04B 17/318* (2015.01)
*H04W 28/04* (2009.01)
*H04W 28/18* (2009.01)
*H04W 52/14* (2009.01)
*H04W 84/04* (2009.01)

(56) References Cited

U.S. PATENT DOCUMENTS

| | | |
|---|---|---|
| 2009/0111499 A1 | 4/2009 | Bosch et al. |
| 2009/0279519 A1* | 11/2009 | Brisebois et al. ............. 370/338 |
| 2010/0167777 A1* | 7/2010 | Raghothaman et al. ...... 455/522 |
| 2011/0177806 A1* | 7/2011 | Kazmi et al. ............... 455/422.1 |

FOREIGN PATENT DOCUMENTS

| | | |
|---|---|---|
| WO | 02080597 A1 | 10/2002 |
| WO | 2009142954 A1 | 11/2009 |

OTHER PUBLICATIONS

Great Britain Search Report dated Jun. 10, 2010 (7 pages).
3GPP TR 36.814 V9.0.0 "3rd Generation Partnership Project; Technical Specification Group Radio Access Network; Further Advancements for E-UTRA Physical Layer Aspects"; published Mar. 2010; 107 pages.

* cited by examiner

ACCESS POINT, COMMUNICATION SYSTEM AND METHOD FOR ESTIMATING A PATH LOSS VALUE THEREFOR

CROSS REFERENCE TO RELATED APPLICATIONS

This application is a national phase application of International Application No. PCT/EP2011/052979, filed 1 Mar. 2010, claiming priority to Great Britain Application No. 1003520.2, filed 3 Mar.2010, which is incorporated by reference herein in its entirety.

FIELD OF THE INVENTION

The field of this invention relates to a method for estimating a path loss value. The invention is applicable to, but not limited to, a method for estimating a path loss value for a femto cell in a wireless communication system.

BACKGROUND OF THE INVENTION

Wireless communication systems, such as the $3^{rd}$ Generation (3G) of mobile telephone standards and technology, are well known. An example of such 3G standards and technology is the Universal Mobile Telecommunications System (UMTS), developed by the $3^{rd}$ Generation Partnership Project (3GPP) (www.3qpp.orq). The $3^{rd}$ generation of wireless communications has generally been developed to support macro-cell mobile phone communications. Such macro cells utilise high power base stations (NodeBs in 3GPP parlance) to communicate with wireless Communication units within a relatively large coverage area. Typically, wireless communication units, or User Equipment (UEs) as they are often referred to in 3G parlance, communicate with a Core Network (CN) of the 3G wireless communication system via a Radio Network Subsystem (RNS). A wireless communication system typically comprises a plurality of radio network subsystems, each radio network subsystem comprising one or more cells to which UEs may attach, and thereby connect to the network. Each macro-cellular RNS further comprises a controller, in a form of a Radio Network Controller (RNC), operably coupled to the one or more Node Bs, via an Iub interface.

In order to limit inter-cell interference, it is known for each base station (NodeB) to be configured with a maximum transmit power for each cell supported by that NodeB. In this manner, the transmit power of any given NodeB is limited in order to limit the interference caused by transmissions from that NodeB to neighbouring cells. Typically, the geographical coverage of a cell is typically defined by the area within which a maximum allowed path loss (MAPL) is achieved. Thus, since the path loss for a signal transmitted by the NodeB at any given location is directly affected by the transmit power for that signal, there is a significant correlation between the geographical cell coverage and the maximum transmit power of the NodeB for that cell. In a conventional macro-cellular network, the location and geographical coverage of each macro cell is typically planned and arranged according to network requirements by the network operator. Accordingly, the maximum transmit power and MAPL for each cell supported by a NodeB is typically configured in accordance with the planned geographical coverage for that cell. Furthermore, the network operator is able to continuously monitor the coverage of the macro cells within the network, and reconfigure the maximum transmit power and MAPL of individual cells to increase or decrease the size of the cell, as required, to ensure sufficient geographical network coverage, whilst limiting the inter-cell interference.

Lower power (and therefore smaller coverage area) femto cells (or pico-cells) are a recent development within the field of wireless cellular communication systems. Femto cells or pico-cells (with the term femto cells being used hereafter to encompass pico-cells or similar) are effectively communication coverage areas supported by low power base stations (otherwise referred to as Access Points (APs)). These femto cells are intended to be able to be piggy-backed onto the more widely used macro-cellular network and support communications to UEs in a restricted, for example 'in-building', environment.

Typical applications for such femto APs include, by way of example, residential and commercial (e.g. office) locations, 'hotspots', etc, whereby an AP can be connected to a core network via, for example, the Internet using a broadband connection or the like. In this manner, femto cells can be provided in a simple, scalable deployment in specific in-building locations where, for example, network congestion at the macro-cell level may be problematic.

Significantly, such femto APs are not deployed in accordance with an overall planned network design/strategy, but rather on an ad hoc basis as required by individual users. Accordingly, parameters such as a maximum transmit power, MAPL, etc. for such femto cells are typically not configured on a planned individual basis by the network operator, but rather are typically configured according to default values determined by, say, the manufacturers of the femto APs. For example, a femto AP may be arranged to support a femto cell forming part of a particular cellular network. Thus, the network operator for that cellular network will typically define a generic/default MAPL for femto cells within that network, and the generic/default MAPL is accessible from a Management Information Base (MIB). The manufacturer of the femto AP may then configure a default maximum transmit power for the femto AP, in order to achieve a required cell coverage area within which such an MAPL for that network is achieved.

A problem with this method of configuring such parameters as the maximum transmit power and MAPL of femto cells and femto APs is that it is a very coarse, general, approach that does not take into consideration the individual circumstances and requirements for individual femto cells and their geographical locations. Furthermore, because of the variable nature of the deployment of femto cells, and the predicted large numbers of femto cells, it is not practical or even possible for a network operator or other technically competent entity to individually (re)configure the maximum transmit power, MAPL, etc. of a femto AP, and typical users are unlikely to be sufficiently competent to perform such an operation.

Thus, a need exists for a method and apparatus for enabling the dynamic configuration of femto cell parameters based on characteristics of a location of the femto access point supporting the femto cell.

SUMMARY OF THE INVENTION

Accordingly, examples of the invention seek to mitigate, alleviate or eliminate one or more of the above mentioned disadvantages singly or in any combination. Aspects of the invention provide a method for configuring a transmit power level for a femto access point, a femto access point, a communication system and a computer-readable storage element, as described in the appended claims.

According to a first aspect of the invention, there is provided a method for estimating a path loss value for a femto cell. The method comprises, at a femto access point of the femto cell, receiving at least one indication of signal strength for at least one neighbour cell from at least one wireless communication unit, analysing the received at least one indication to determine at least one location characteristic, and estimating a path loss value for the femto cell based at least partly on the determined at least one location characteristic.

Thus, in one example embodiment of the invention, the femto access point is able to dynamically reconfigure parameters for the femto cell based on the individual circumstances and requirements for the femto cell supported thereby and its location.

According to an optional feature of the invention, the method may further comprise instructing at least one wireless communication unit located within the femto cell to report at least one signal strength measurement for at least one neighbour cell.

According to an optional feature of the invention, the step of analysing the received at least one indication of signal strength for the at least one neighbour cell to determine at least one location characteristic may comprise analysing the received at least one indication of signal strengths for the at least one neighbour cell to detect a presence of one or more signal obstruction, and upon detection of the presence of at least one signal obstruction, estimating the path loss value for the femto cell based at least partly on the detection of the presence of at least one signal obstruction. In this manner, a signal obstruction that is detected may be determined as comprising, say, an external wall or the like, corresponding to the location in which the femto access point has been deployed. As such the detected signal obstruction may be deemed to represent an outer boundary for the femto cell provided by the femto access point.

According to an optional feature of the invention, the step of analysing the received at least one indication of signal strength for the at least one neighbour cell to detect a presence of one or more signal obstruction may comprise identifying expeditious changes in one or more neighbour cell signal strengths and determining the most distance concurrent identified changes in neighbour cell signal strengths. For example, the step of analysing the received at least one indication of signal strength for the at least one neighbour cell to detect a presence of signal obstructions may comprise identifying expeditious changes in one or more neighbour cell signal strength observed over a period of time >t for which opposing concurrent changes in home cell signal strength exist. The step of analysing may further comprise determining the most distant concurrent changes in neighbour cell signal strengths comprising signal gain/loss >x, and determining whether the number of neighbour cells experiencing the changes >n. If the number of neighbour cells experiencing the changes >n, the step of analysing may further comprise detecting the presence of a signal obstruction. Additionally or alternatively, the step of analysing the received at least one indication of signal strength for the at least one neighbour cell, in order to detect a presence of one or more signal obstructions, may comprise identifying expeditious temporary increases in neighbour cell signal strengths observed over a period of time >t, determining the most distant concurrent increases in neighbour cell signal strengths comprising signal gain >x, and determining whether the number of neighbour cells experiencing the increases >n. If the number of neighbour cells experiencing the increases >n, the step of analysing may further comprise detecting the presence of a signal obstruction. At least one of t, x and n may comprise a configurable parameter.

According to an optional feature of the invention, upon detection of the presence of a signal obstruction, the method may comprise estimating the path loss value for the femto cell relative to the detected signal obstruction. Furthermore, upon detection of the presence of a plurality of signal obstructions, the method may comprise estimating the path loss value for the femto cell relative to at least one consisting from a group of:

a furthest detected signal obstruction;
(ii) a nearest detected signal obstruction;
(iii) an $n^{th}$ furthest detected signal obstruction; and
(iv) an $n^{th}$ nearest detected signal obstruction.

According to an optional feature of the invention, the method may comprise receiving at least one indication of signal strength for at least one neighbour macro cell from at least one wireless communication unit, and analysing the received at least one indication of signal strength for the at least one neighbour macro cell, in order to determine at least one location characteristic.

According to an optional feature of the invention, the method may further comprise reconfiguring a Maximum Allowable Path Loss (MAPL) parameter for the femto cell based at least partly on the estimated path loss value.

According to an optional feature of the invention, the method may further comprise reconfiguring a transmit power level for the femto access point based at least partly on the estimated path loss value.

According to an optional feature of the invention, the method may further comprise reconfiguring a transmit power level of at least one wireless communication unit located within the femto cell based at least partly on the estimated path loss value.

According to an optional feature of the invention, the femto access point may be arranged to support a femto cell within a Universal Mobile Telecommunications System (UMTS) cellular network.

According to a second aspect of the invention, there is provided an access point for supporting communication in a femto cell of a cellular communication network. The femto access point comprises transceiver circuitry arranged to enable communication with at least one wireless communication unit located within the femto cell, and a signal processing module arranged to configure a transmission of data over a communication channel to/from a wireless communication unit within the femto cell. The signal processing module is arranged to receive at least one indication of signal strength for at least one neighbour cell from at least one wireless communication unit, analyse the received at least one indication of signal strength for the at least one neighbour cell to determine at least one location characteristic, and estimate a path loss value for the femto cell based at least partly on the determined at least one location characteristic.

According to a third aspect of the invention, there is provided a communication system comprising a femto access point for supporting communication in a femto cell of a cellular communication network. The femto access point comprises transceiver circuitry arranged to enable communication with at least one wireless communication unit located within the femto cell, and a signal processing module arranged to configure a transmission of data over a communication channel to/from a wireless communication unit within the femto cell. The signal processing module is arranged to receive at least one indication of signal strength for at least one neighbour cell from at least one wireless communication unit, analyse the received at least one indication of signal strength for the at least one neighbour cell in order to determine at least one location characteristic, and estimate a path loss value for the femto cell based at least partly on the determined at least one location characteristic.

According to a fourth aspect of the invention, there is provided an integrated circuit comprising the aforementioned signal processing module.

According to a fifth aspect of the invention, there is provided a computer-readable storage element having computer-readable code stored thereon for programming signal processing logic to perform a method for estimating a path loss value for a femto cell, the code operable for performing the method according to the first aspect of the invention.

These and other aspects of the invention will be apparent from, and elucidated with reference to, the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. Like reference numerals have been included in the respective drawings to ease understanding.

DETAILED DESCRIPTION

Examples of the invention will be described in terms of a third generation (3G) access point for supporting a femto cell within a Universal Mobile Telecommunications System (UMTS) cellular communication network. However, it will be appreciated by a skilled artisan that the inventive concept herein described may be embodied in any type of access point for supporting a femto cell (or similar) within a cellular communication network. In a number of applications, the adaptation of an access point in accordance with the examples of the invention effectively performs a method for configuring a transmit power level for a femto access point. In particular, the access point is arranged to receive at least one indication of signal strength for at least one neighbour cell from at least one wireless communication unit, analyse the received at least one indication of signal strength for the at least one neighbour cell in order to determine at least one location characteristic, and configure the transmit power level for the femto access point based at least partly on the determined at least one location characteristic. In this manner, the access point is able to dynamically reconfigure its transmit power level to take into consideration the individual circumstances and requirements for the femto cell(s) supported thereby and its/their location(s).

Figure 1:
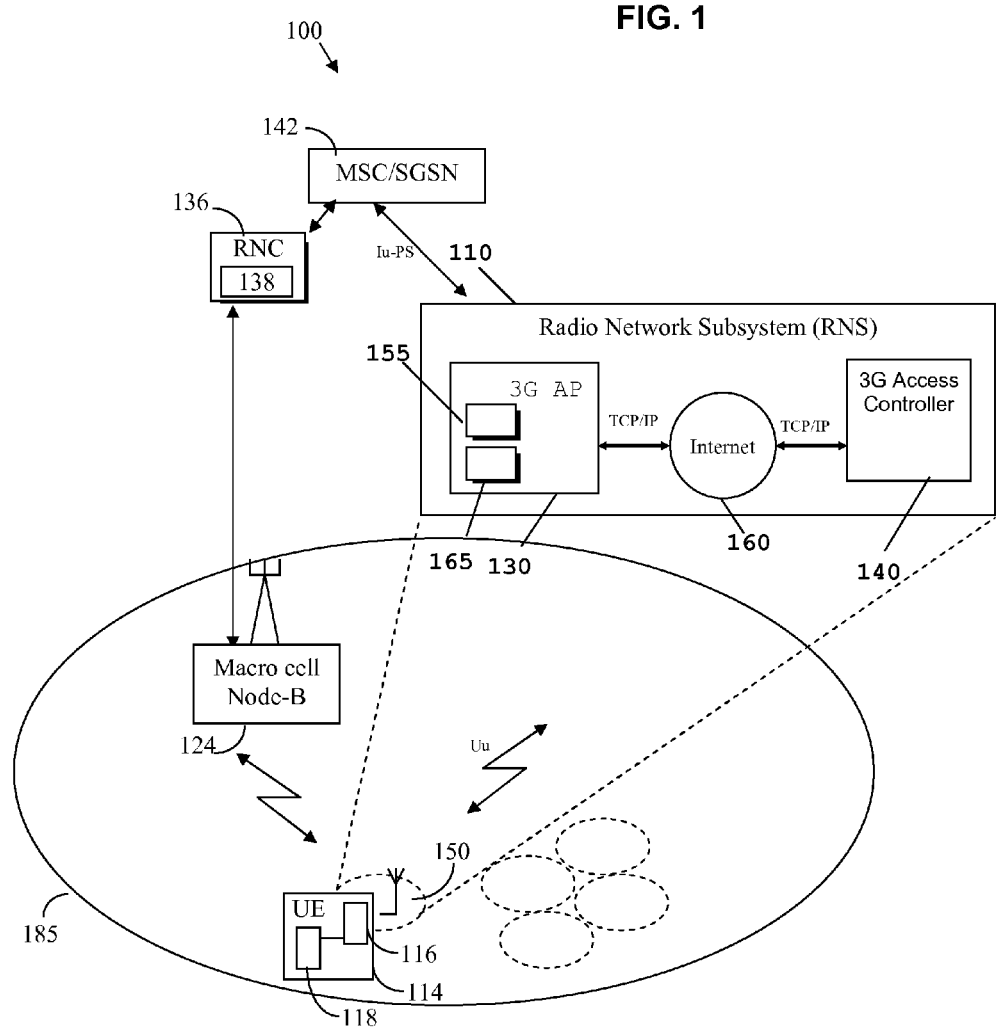
FIG. 1 illustrates an example of a part of a cellular communication network.

Referring now to the drawings, and in particular FIG. 1, an example of part of a cellular communication network, adapted in accordance with an example embodiment of the invention, is illustrated and indicated generally at 100. In FIG. 1, there is illustrated an example of a communication system in a form of a third generation partnership project (3GPP) UMTS network 100 that comprises a combination of a macro cell 185 and a plurality of 3G femto cells 150 in accordance with one embodiment of the invention. For the example embodiment illustrated in FIG. 1, the radio network subsystem (RNS) comprises two distinct architectures to handle the respective macro cell and femto cell communications.

In the macro cell scenario, the RNS comprises a controller in the form of a Radio Network Controller (RNC) 136 having, inter alia, signal processing logic 138. The RNC 136 is operably coupled to a NodeB 124 for supporting communications within the macro cell 185. The RNC 136 is further operably coupled to a core network element 142, such as a serving general packet radio system (GPRS) support node (SGSN)/mobile switching centre (MSC), as known.

In a femto cell scenario, an RNS 110 comprises a network element, which for the illustrated embodiment is in a form of a 3G Access Point (3G AP) 130, performing a number of functions generally associated with a base station, and a controller in a form of a 3G Access controller (3G AC) 140. As will be appreciated by a skilled artisan, a 3G Access Point is a communication element that supports communications within a communication cell, such as a 3G femto cell 150, and as such provides access to a cellular communication network via the 3G femto cell 150. One envisaged application is that a 3G AP 130 may be purchased by a member of the public and installed in their home. The 3G AP 130 may then be connected to a 3G AC 140 over the owner's broadband internet connection 160.

Thus, a 3G AP 130 may be considered as encompassing a scalable, multi-channel, two-way communication device that may be provided within, say, residential and commercial (e.g. office) locations, 'hotspots' etc, to extend or improve upon network coverage within those locations. Although there are no standard criteria for the functional components of a 3G AP, an example of a typical 3G AP for use within a 3GPP system may comprise some NodeB functionality and some aspects of radio network controller (RNC) 136 functionality. For the illustrated embodiment, the 3G AP 130 further comprises transceiver circuitry 155 arranged to enable communication with one or more wireless communication units located within the general vicinity of the communication cell 150, and in particular within the communication cell 150, such as User Equipment (UE) 114, via a wireless interface (Uu).

The 3G Access Controller 140 may be coupled to the core network (CN) 142 via an Iu interface, as shown. In this manner, the 3G AP 130 is able to provide voice and data services to a cellular handset, such as UE 114, in a femto cell in contrast to the macro cell, in the same way as a conventional NodeB, but with the deployment simplicity of, for example, a Wireless Local Area Network (WLAN) access point.

In accordance with some example embodiments of the invention, the 3G AP 130 comprises a signal processing module 165 arranged to receive at least one indication of signal strength for at least one neighbour cell from at least one wireless communication unit, analyse the received at least one indication of signal strength for the at least one neighbour cell in order to determine at least one location characteristic, and estimate a path loss value for a femto cell of the femto AP based at least partly on the determined at least one location characteristic.

For example, when the femto AP 130 is initially deployed, the signal processing module 165 may be arranged to configure initial settings such as power transmit power level, maximum allowable path loss (MAPL), etc. for the femto AP 130. Such initial settings may be configured according to a default 'factory' setting, whereby a manufacturer of the femto AP 130 configures such a default maximum transmit power for the femto AP in order to achieve a required cell coverage area within which the MAPL condition is met. In this manner, the femto AP 130 is able to establish a femto cell 150 for which the initial maximum power transmit level and MAPL comprise coarse, default settings, and with which wireless communication units, such as UE 118, are able to connect.

Having established a femto cell 150, the femto AP 130 is then able to instruct UEs connected thereto to measure and report one or more signal strength levels for signals received from neighbouring cells, and in particular for neighbour macro cells, such as macro cell 185. Thus, UEs will provide signal strength measurement reports for the 'home' cell (i.e. the femto cell provided by the femto AP 130) as is known, and signal strength measurement reports for neighbouring cells as instructed by the femto AP 130. In the case of a 3GPP UMTS cell, the signal strength measurement reported by the UEs may comprise a measurement of the Received Signal Code Power (RSCP) of a Common Pilot Channel (CPICH) and Path Loss for the cell. Conversely, in a case of a second generation (2G) GSM (Global System for Mobile communications) cell, the signal strength measurement reported by the UEs may comprise a measurement of the RSSI (received signal strength indicator) for that cell.

The femto AP 130 may instruct UEs connected thereto to perform the one or more signal strength measurements periodically, and/or based on an event-triggered mechanism, whilst the UEs are in an RRC (Radio Resource Control) "connected mode". Such signal strength measurements for the home (femto) cell and neighbouring cells should be performed substantially in parallel, or at least at approximately the same times, in order to provide substantially concurrent signal strength measurements for the home and neighbouring cells.

In accordance with some example embodiments of the invention, the signal processing module 165 of the femto AP 130 may be arranged to analyse the received signal strength measurements for neighbour cells to determine one or more location characteristics. For example, the signal processing module 165 may be arranged to analyse the received one or more signal strength measurements for neighbour cells, in order to detect a presence of one or more signal obstructions, such as walls or the like, and upon detection of a presence of one or more signal obstructions, to estimate a path loss value for the femto cell 150 based at least partly on the detection of the presence of the one or more signal obstructions, as described in greater detail below. In this manner, the estimated path loss value is based at least partly on the characteristics of the location of the femto AP 130, and as such provides a reference with which femto cell parameters such as, by way of example only, the maximum transmit power and the MAPL for the femto cell 150 may be configured, and in particular, with which such parameters may be dynamically configured.

Figure 2:
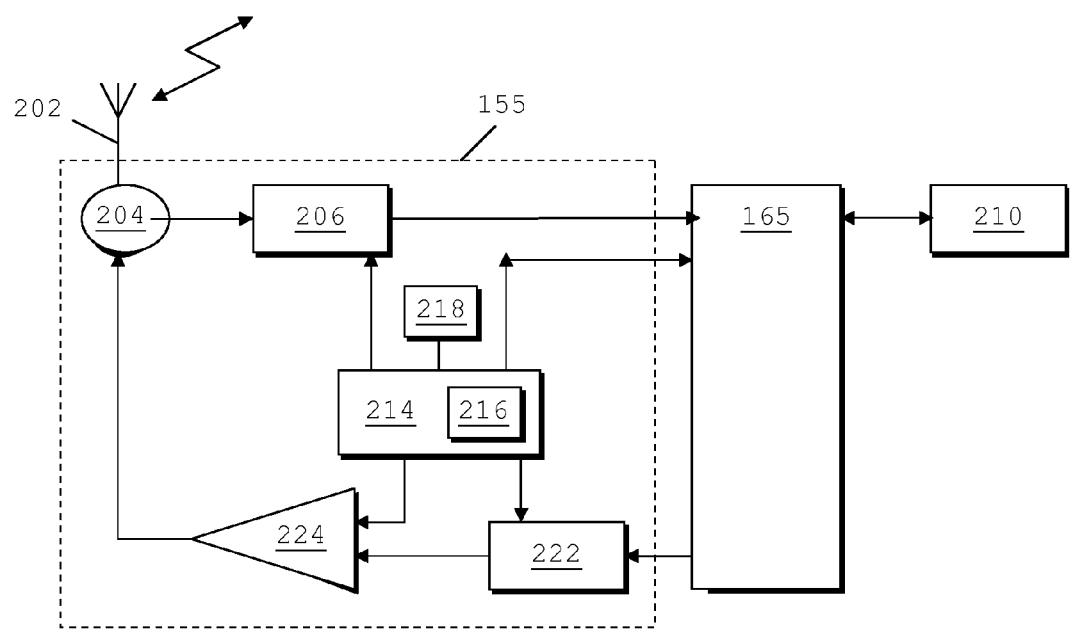
FIG. 2 illustrates an example of a block diagram of a femto access point.

Referring now to FIG. 2, an example of a block diagram of the femto AP 130 is shown. The example femto AP 130 contains an antenna 202 coupled to the transceiver circuitry 155. More specifically for the illustrated example, the antenna 202 is preferably coupled to a duplex filter or antenna switch 204 that provides isolation between receive and transmit chains within the femto AP 130.

The receiver chain, as known in the art, includes receiver front-end circuitry 206 (effectively providing reception, filtering and intermediate or base-band frequency conversion). The front-end circuitry 206 is serially coupled to the signal processing module 165. An output from the signal processing module 165 is provided to a transmit element of a network connection 210, for example operably coupling the signal processing module 165 to the access controller 140 of FIG. 1 via, say, the Internet 160. The controller 214 is also coupled to the receiver front-end circuitry 206 and the signal processing module 165 (generally realised by a digital signal processor (DSP)). The controller 214 is also coupled to a memory device 216 that selectively stores operating regimes, such as decoding/encoding functions, synchronisation patterns, code sequences, RSSI/RSCP data and the like. In accordance with examples of the invention, the memory device 216 stores computer-readable code thereon for programming the signal processing module 165 to perform a method for estimating a path loss value for a femto cell 150 supported by the femto AP 130 of FIG. 1. Furthermore, a timer 218 is operably coupled to the controller 214 to control the timing of operations (transmission or reception of time-dependent signals) within the femto access point 130.

As regards the transmit chain, this essentially includes a receiving element of a network connection 210, coupled in series through transmitter/modulation circuitry 222 and a power amplifier 224 to the antenna 202. The transmitter/modulation circuitry 222 and the power amplifier 224 are operationally responsive to the controller 214, and as such are used in transmitting data to a wireless communication unit, such as UE 118.

The signal processor module 165 in the transmit chain may be implemented as distinct from the processor in the receive chain. Alternatively, a single processor may be used to implement processing of both transmit and receive signals, as shown in FIG. 2. Clearly, the various components within the access point 130 can be realised in discrete or integrated component form, with an ultimate structure therefore being merely an application-specific or design selection.

In accordance with examples of the invention, the signal processing module 165 of the femto access point 130 is arranged to receive at least one indication of signal strength for at least one neighbour cell from at least one wireless communication unit, analyse the received at least one indication of signal strength for the at least one neighbour cell to determine at least one location characteristic, and estimate a path loss value for the femto cell 150 based at least partly on the determined at least one location characteristic.

Figure 3:
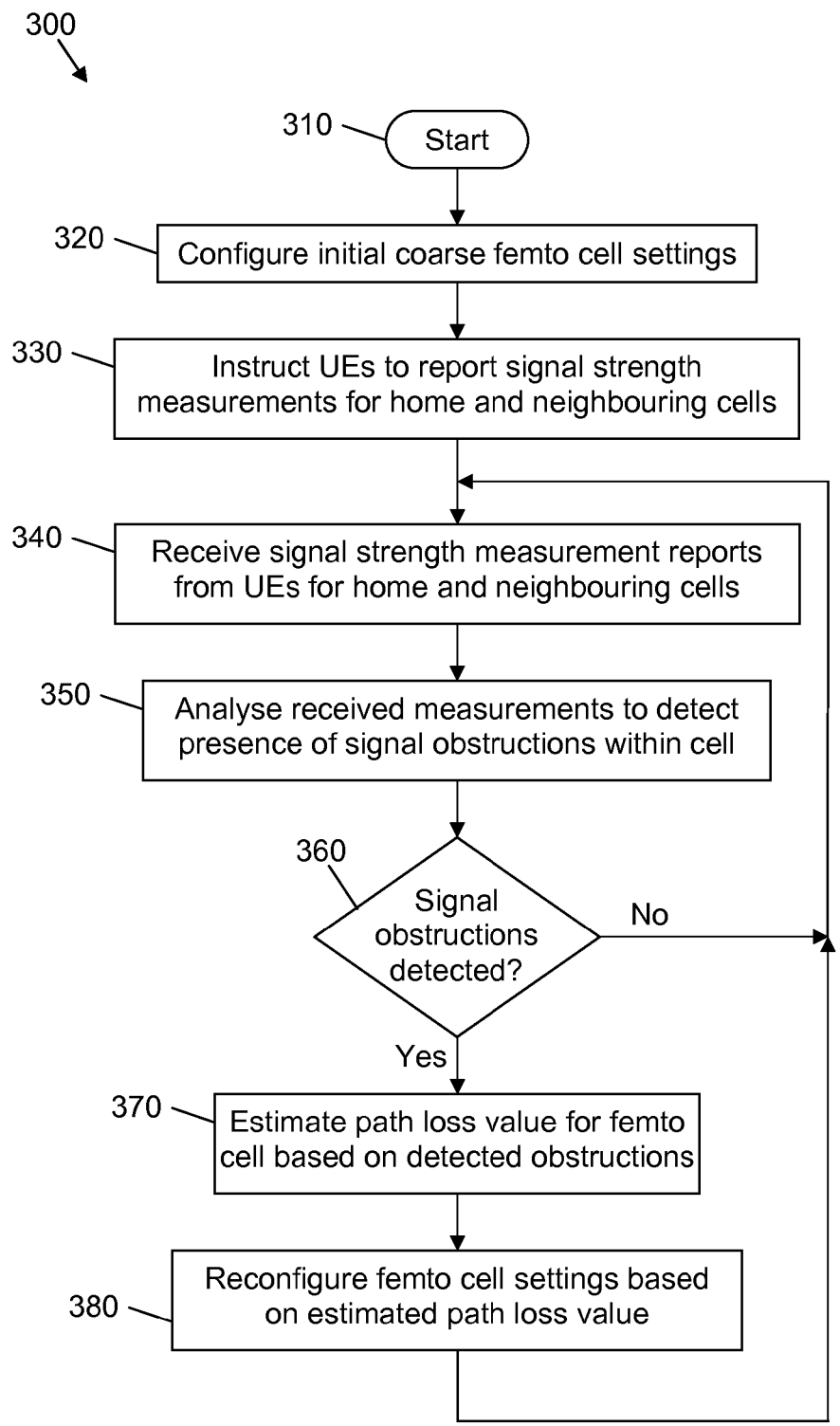
FIG. 3 illustrates an example of a simplified flowchart of a method for configuring a transmit power level.

Referring now to FIG. 3, there is illustrated an example of a simplified flowchart 300 of a method for estimating a path loss value of a femto cell according to some example embodiments, such as may be implemented by the signal processing module 165 of the access point of FIGS. 1 and 2.

The method starts at 310, and moves on to 320 where coarse femto cell settings are configured, for example such as a transmit power level setting, an MAPL setting, etc. Such initial coarse settings may be configured according to default 'factory' settings, whereby a manufacturer of the femto access point configures such default settings for the femto AP in order to achieve, say, a required cell coverage area within which a Maximum Allowed Path Loss (MAPL) condition is met. In this manner, the femto access point is able to establish a suitable signal range for a femto cell for which the initial transmit level comprises a coarse, default maximum transmit power level, and with which wireless communication units, such as UE 118, are able to connect. Wireless communication units, such as UE 118, are then instructed to report signal strength measurements for the neighbouring cells, at 330. For the illustrated example, the wireless communication units are also instructed to report signal strength measurements for the 'home' femto cell. However, it will be appreciated that, in some example embodiments, the wireless communication units may be arranged to report signal strength measurements for a home (i.e. a cell on which they are camped) without the need to be instructed to do so. In such a case, instructing the wireless communication units to report signal strength measurements for the home femto cell may be omitted.

Indications of signal strengths for the home and neighbour cells are then received at 340, which for the illustrated example is in a form of signal strength measurements reports.

For example, in the case of a 3GPP UMTS cell, the signal strength measurements reported by the wireless communication units may comprise a measurement of the Received Signal Code Power (RSCP) of a Common Pilot Channel (CPICH) and Path Loss for the neighbour cell. Conversely, in the case of a second generation (2G) GSM (Global System for Mobile communications) cell, the signal strength measurement reported by the UEs may comprise a measurement of the RSSI (received signal strength indicator) for that cell.

Upon receipt of one or more indications of signal strength for the home and one or more neighbour cells from the wireless communication units at 340, the method moves on to 350 where the received signal strength measurements are analysed to detect whether a presence of one or more signal obstructions within the femto cell exists. If a signal obstruction is detected at 360, the method moves on to 370 where a path loss value for the femto cell is estimated based (at least partly) on the detected obstructions. For the illustrated example, femto cell settings (for example as initially coarsely set in step 320) are then reconfigured based on the estimated path loss value for the femto cell at 380. For example, such reconfigured femto cell settings may comprise, say, a transmit power level setting, an MAPL setting, etc. Following the re-configuring of the femto cell settings, the method loops back to step 340. Referring back to step 360, if no signal obstruction is detected, the method loops directly back to step 340.

Referring now to FIGS. 4 to 10, examples of techniques for analysing the signal strength measurements of neighbouring cells to detect a presence of one or more obstructions within the femto cell are illustrated. A well known phenomenon for radio frequency (RF) signals is that RF propagation through obstacles such as walls, and in particular exterior walls (which tend to be more substantial in construction than interior walls) results in significant loss of energy. Accordingly, by analysing the signal strengths of RF signals as measured by a wireless communication unit, expeditious increases and decreases of such signal strengths measured by a wireless communication unit may be interpreted as resulting from the presence of signal obstructions such as walls or the like as the wireless communication unit moves around a geographical area.

Figure 4:
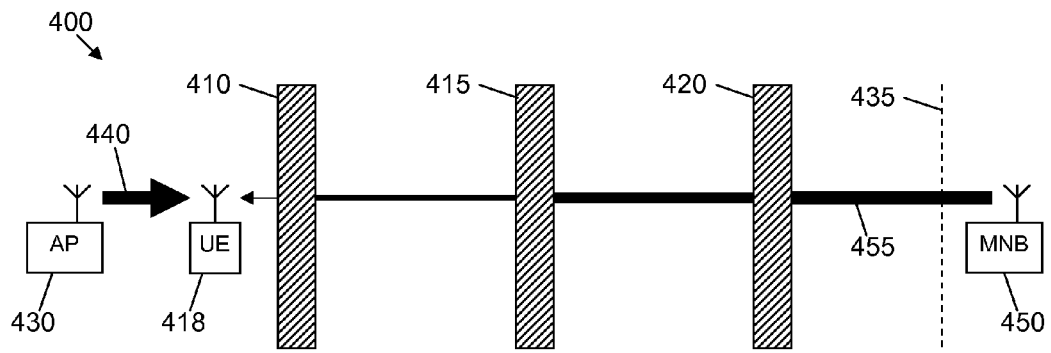
FIGS. 4 to 6 illustrate an example of a femto cell deployment.

For example, FIG. 4 illustrates an example of a femto cell deployment 400 comprising a femto access point 430 arranged to support a femto cell having a cell boundary located generally at 435. For the illustrated example, three signal obstructions in the form of walls are located within the femto cell, and illustrated generally at 410, 415, 420. A wireless communication unit (UE) 418 is located within the femto cell provided by the femto AP 430, and more particularly for FIG. 4 is located close to the femto AP 430 such that none of the walls 410, 415, 420 are positioned between the UE 418 and the femto AP 430. Accordingly, an RF signal 440 transmitted by the femto AP 430 is received by the UE 418 as a relatively strong signal. The UE 418 also receives an RF signal 455 transmitted by a NodeB 450 of a neighbouring macro cell located 'outside' of the walls 410, 415, 420. As such, the RF signal 455 transmitted by the macro NodeB 450 has to propagate through each of the three walls 410, 415, 420 before it is received by the UE 418. Accordingly, the RF signal 455 transmitted by the Node B 450 is received by the UE 418 as a relatively weak signal.

Figure 5:
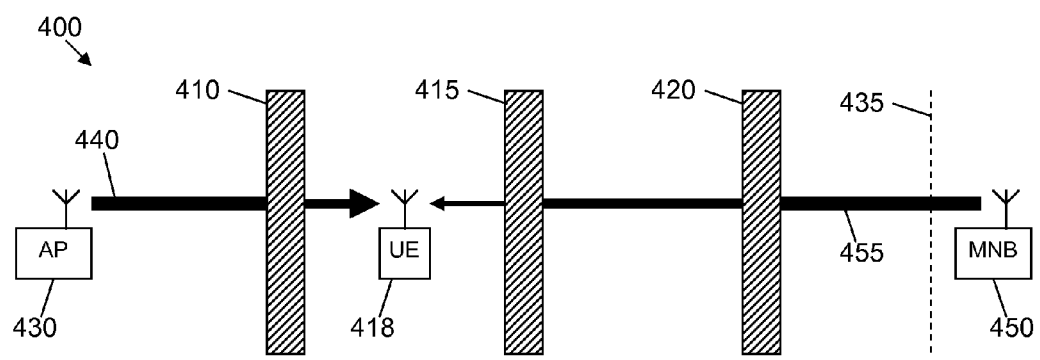

Referring now to FIG. 5 there is illustrated the femto cell deployment 400 of FIG. 4 whereby the UE 418 has moved away from the femto AP 430 such that it is now located between a first wall 410 and a second wall 415. As such, the RF signal 440 transmitted by the femto AP 430 now has to propagate through the first wall 410. Accordingly, the RF signal 455 transmitted by the femto AP 430 is received by the UE 418 as a weaker signal than in the example of FIG. 4. Conversely, the RF signal 455 transmitted by the neighbouring macro NodeB 450 only has to propagate through two of the three walls. Accordingly, the RF signal 455 transmitted by the femto AP 430 is received by the UE 418 as a stronger signal than in the example of FIG. 4.

Figure 6:
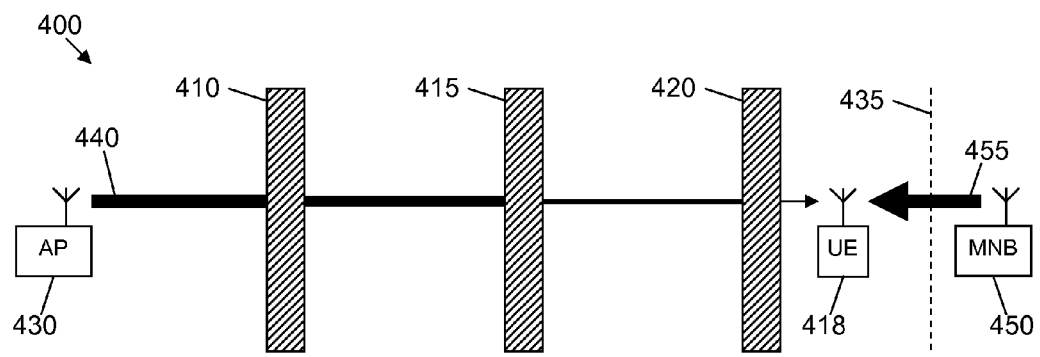

Referring now to FIG. 6, there is illustrated the femto cell deployment 400 of FIG. 4 whereby the UE has moved towards the edge of the femto cell, such that it is located 'outside' of the three walls. As such, the RF signal 440 transmitted by the femto AP 430 now has to propagate through all three walls 410, 415, 420. Accordingly, the RF signal 440 transmitted by the femto AP 430 is received by the UE 418 as a relatively weak signal. Conversely, the RF signal 455 transmitted by the neighbouring macro NodeB 450 does not have to propagate through any of the walls 410, 415, 420. Accordingly, the RF signal 455 transmitted by the neighbouring macro NodeB 450 is received by the UE 418 as a relatively strong signal vis-à-vis the example of FIG. 4.

Figure 7:
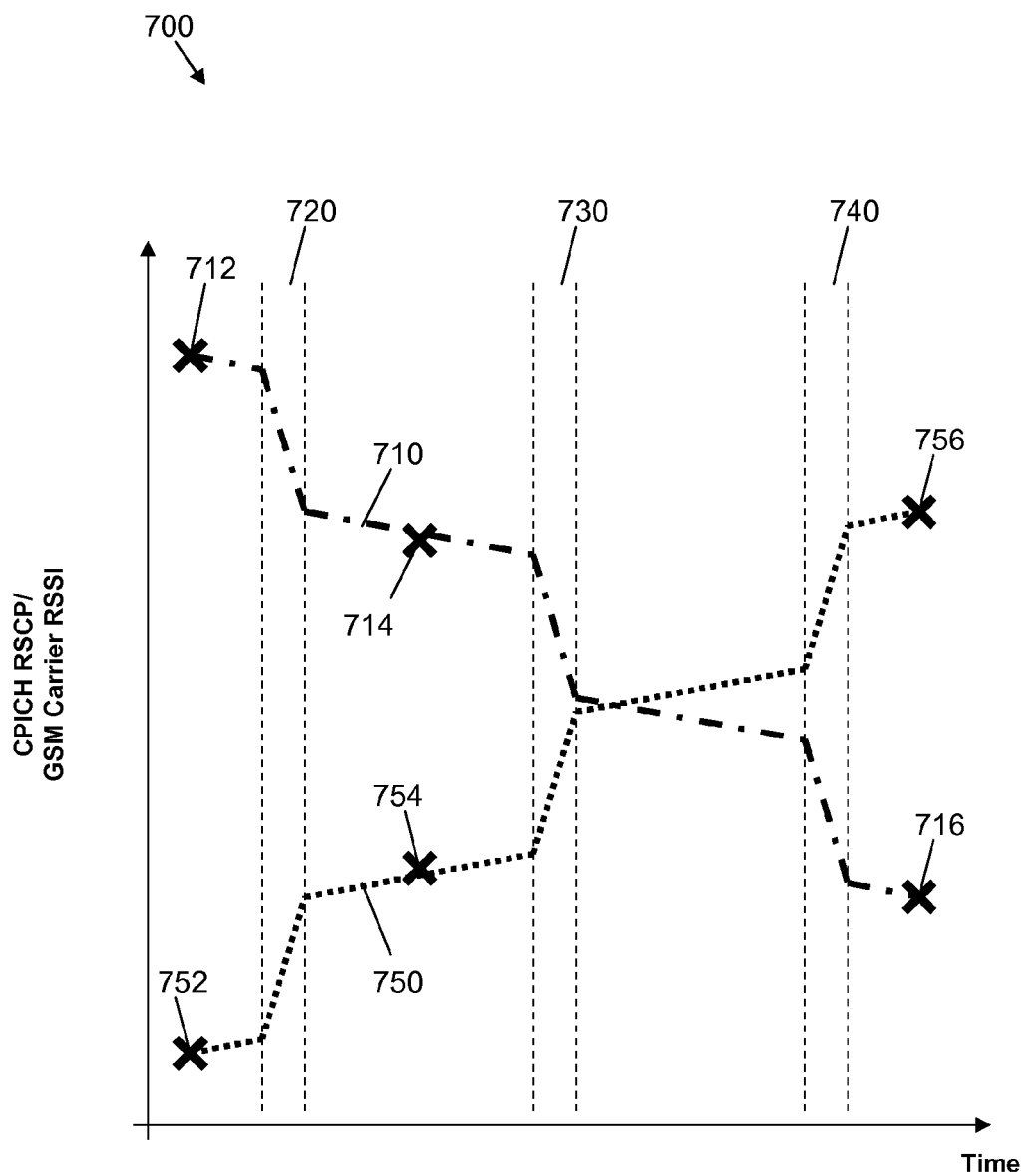
FIG. 7 illustrates a simplified graph showing example signal strength measurements.

FIG. 7 illustrates a simplified graph 700 showing examples of signal strength measurements for the RF signals 440, 455 transmitted by the femto AP 430 and neighbouring macro NodeB 450 respectively of FIGS. 4 to 6, as might be measured by the UE 418 over a period of time as the UE 418 moves from a position illustrated generally in FIG. 4 to a position illustrated generally in FIG. 6.

Plot 710 illustrates signal strength measurements made by the UE 118 for the RF signal 440 transmitted by the AP 430. At an initial location for the UE 118, such as generally illustrated in FIG. 4, the UE 118 measures a high signal strength, as illustrated at 712. As the UE 118 moves generally away from the AP 430 the signal strength measured by the UE 118 for the RF signal 440 falls at a gradual rate until the UE 118 passes from a near side (relative to the AP 430) of the first wall 410 to a far side of the first wall 410, at which point the UE 118 measures an expeditious fall in the signal strength for the RF signal 440, as illustrated generally at 720. The rate of fall in the signal strength for the RF signal 440 then becomes more level, once again, as the UE 118 continues to move generally away from the AP 430, for example through a position generally illustrated in FIG. 5, and for which a signal strength measurement is illustrated generally at 714. The RF signal 440 experiences similar expeditious falls in signal strength measurements as the UE 118 passes from a near side of each of the walls 415, 420 to a far side thereof, as illustrated generally at 730 and 740 respectively, as the UE 118 moves to a position illustrated in FIG. 6 and for which a signal strength measurement is illustrated generally at 716.

Conversely, Plot 750 illustrates signal strength measurements made by the UE 118 for the RF signal 455 transmitted by the neighbouring macro NodeB 450. At an initial location for the UE 118, such as generally illustrated in FIG. 4, the UE 118 measures a low signal strength, as illustrated at 752. As the UE 118 moves generally away from the AP 430, and towards the neighbouring macro NodeB 450, the signal strength measured by the UE 118 for the RF signal 455 rises at a gradual rate until the UE 118 passes from a near side (relative to the AP 430) of the first wall 410 to a far side of the first wall 410, at which point the UE 118 measures an expeditious rise in the signal strength for the RF signal 455, as also illustrated generally at 720. The rate of rise in the signal strength for the RF signal 455 then becomes more level once again as the UE 118 continues to move generally away from the AP 430, for example through a position generally illustrated in FIG. 5, and for which a signal strength measurement is illustrated generally at 754. The RF signal 455 experiences similar expeditious rises in signal strength measurements as the UE 118 passes from a near side of each of the walls 415, 420 to a far side thereof, as illustrated generally at 730 and 740 respectively, as the UE 118 moves to a position illustrated in FIG. 6 and for which a signal strength measurements is illustrated generally at 756.

Figure 8:
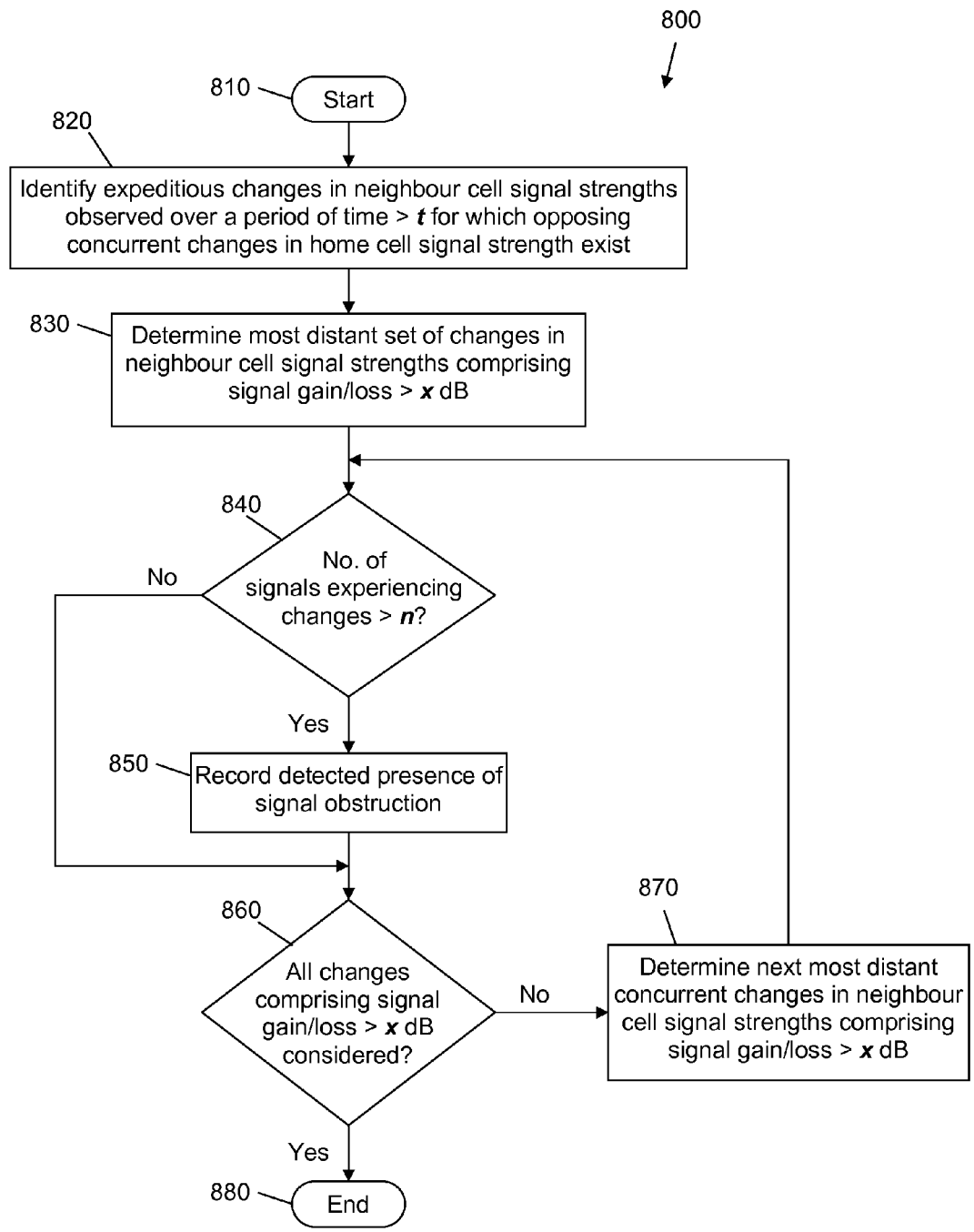
FIG. 8 illustrates a simplified flowchart of a method for analysing received indications of signal strengths.

Referring now to FIG. 8 there is illustrated a simplified flowchart 800 of a method for analysing received indications of signal strengths for one or more neighbour cells to determine location characteristics, for example as may be implemented within step 350 of the method of FIG. 3.

The method starts at step 810, and moves on to step 820 where expeditious changes in neighbour cell signal strengths measured over a period of time are identified. In particular for the illustrated example, such expeditious changes observed over a period of time greater than t (time-to-trigger) are identified for which opposing concurrent changes in a home (femto) cell signal strength exist.

Next, at step 830, a most distant set (with respect to a home femto AP supporting the home femto cell) of identified expeditious changes in neighbour cell signal strengths is determined. For example, a distance from the home femto AP may be inferred from a relative signal strength for the home femto cell, whereby a set of expeditious changes in neighbour cell signal strengths may comprise those expeditious changes identified for which concurrent signal strength measurements for the home femto cell are within a configurable range. Furthermore for the illustrated example, a most distant set of changes in neighbour cell signal strength comprising a signal gain/loss greater than x dB (wall loss) are identified.

It is then determined whether (or not) the identified set of expeditious changes comprises changes in signal strength for a number of neighbour cells greater than n (wall detection validation), i.e. whether the number of neighbouring cell signals experiencing the expeditious changes is greater than n, at step 840. If the number of neighbouring cell signals experiencing the expeditious changes within the identified set is greater than n, the method moves on to step 850 where the detected presence of a signal obstruction, for example a wall, is recorded. The method then moves on to step 860. Referring back to step 840, if the number of neighbouring cell signals experiencing the expeditious changes within the identified set is not greater than n, the method moves straight on to step 860.

For the illustrated example, step 860 comprises determining whether all expeditious changes (or sets of expeditious changes) comprising a signal gain/loss greater than x dB have been considered. If not all of the expeditious changes identified in step 820 comprising a signal gain/loss greater than x dB have been considered, the method moves on to step 870, where a next most distant set of expeditious changes in neighbour cell signals strengths comprising a signal gain/loss greater than x dB are identified, and the method then loops back to step 840. Conversely, if all of the expeditious changes comprising a signal gain/loss greater than x dB have been considered, the method moves on to step 880 and ends.

Accordingly, in this manner, expeditious changes in neighbour cell signal strengths may be used to identify signal obstructions such as walls. In particular, a most distant signal obstruction such as may be representative of an external wall, or other outer boundary/perimeter, may be identified, and used to reconfigure the transmit power for the femto cell.

Figure 9:
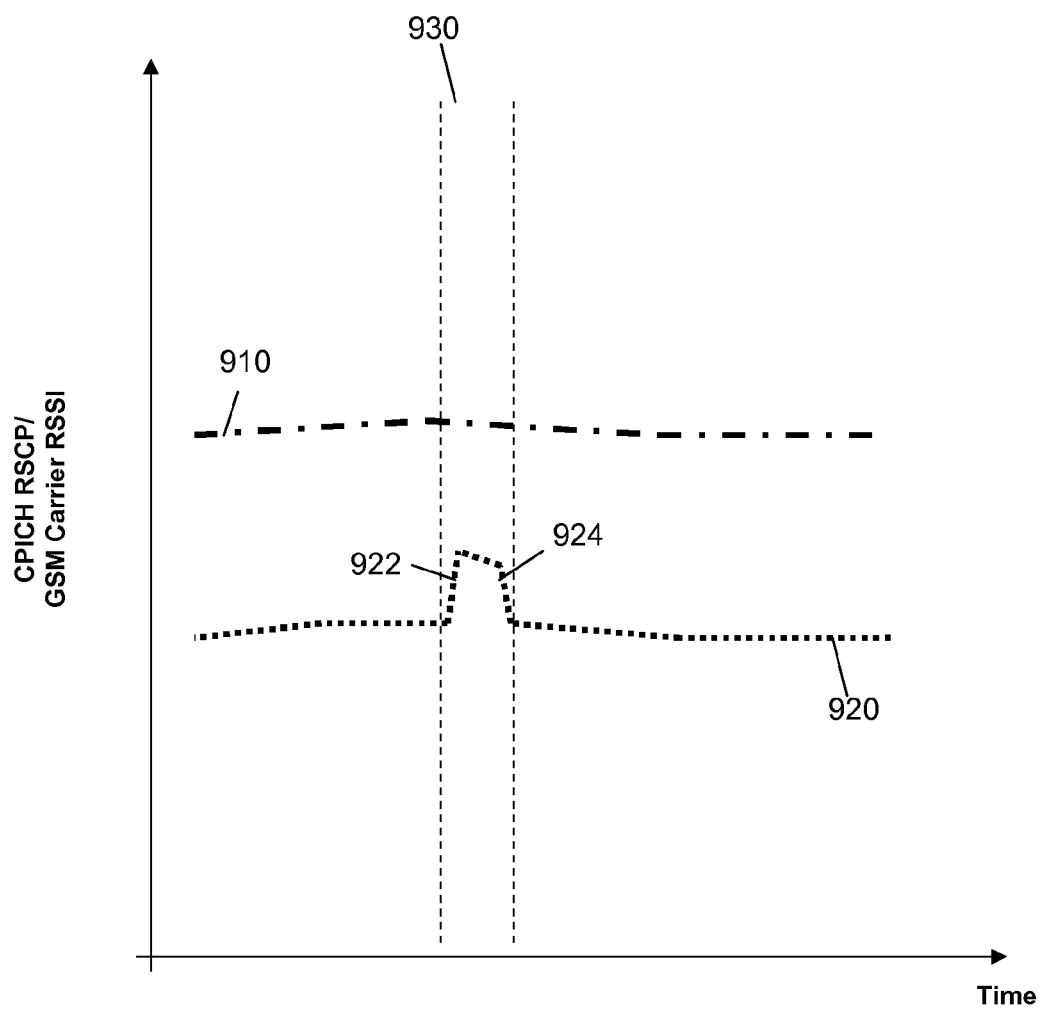
FIG. 9 illustrates a simplified graph showing an alternative example of signal strength measurements.

For many scenarios in which a femto AP may be deployed, for example within a home or office building, a desirable outer boundary/perimeter for the supported femto cell typically comprises an external wall containing one or more windows. RF propagation through windows is significantly less lossy as compared with RF propagation through walls. For example, FIG. 9 illustrates a graph 900 showing examples of signal strength measurements for a home femto access point located on a near side of a wall and a neighbouring macro NodeB located on far side of a wall. In particular, the sign strengths for the home femto AP and the neighbouring NodeB are as measured by a wireless communication device as the wireless communication device moves past a window within the wall.

A first plot 910 illustrates signal strength measurements for an RF signal transmitted by the home femto AP. As can be seen, the signal strength remains substantially level as the UE passes the window, illustrated generally at 930. Conversely, a second plot 920 illustrates signal strength measurements for an RF signal transmitted by the neighbouring macro NodeB. As can be seen, the signal strength as measured by the UE 118 experiences an expeditious rise 922 as the UE passes the window, followed by an expeditious fall 924 as the UE once again is separated from the neighbouring macro NodeB by the wall.

Figure 10:
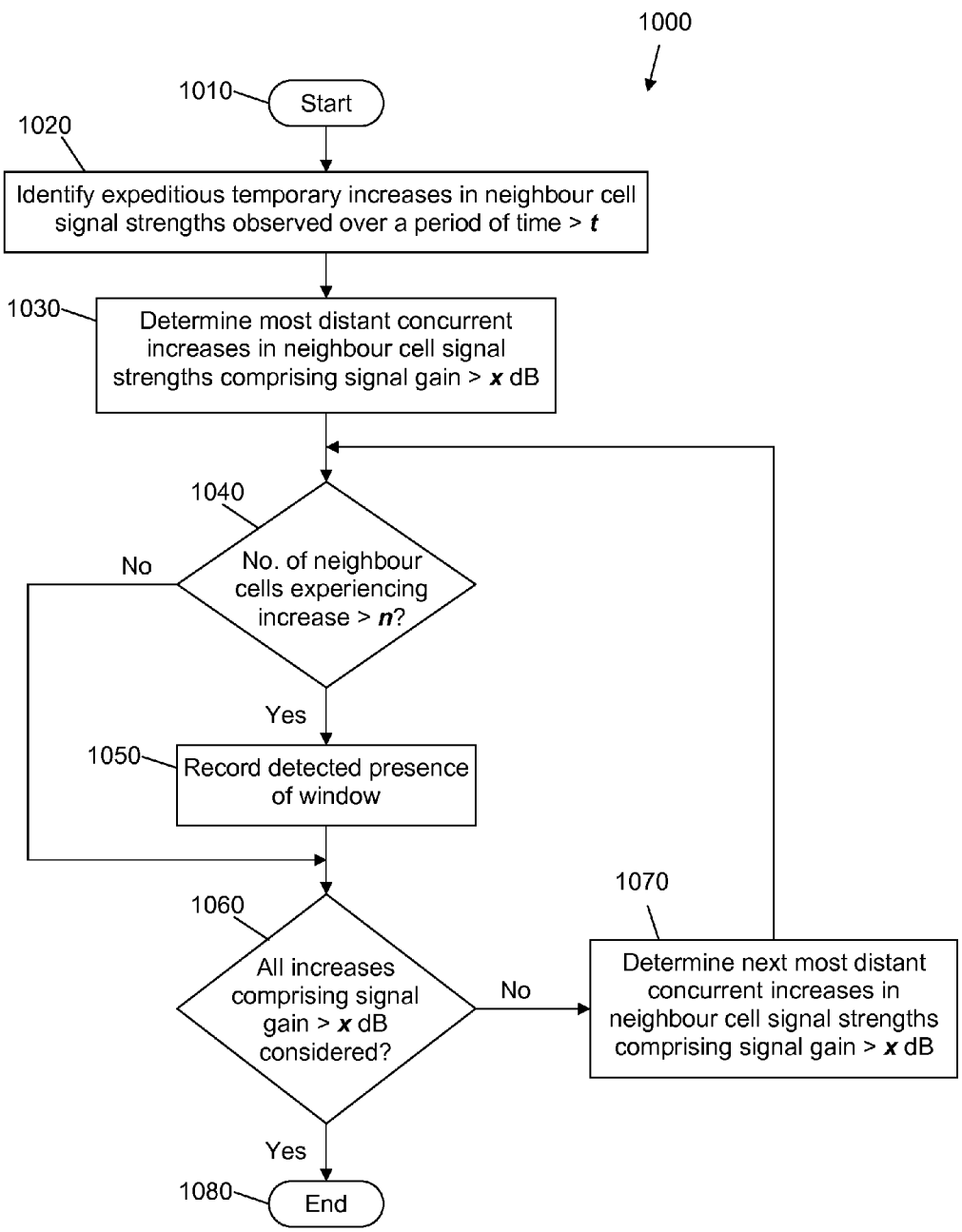
FIG. 10 illustrates a simplified flowchart of an alternative method for analysing received indications of signal strengths.

Referring now to FIG. 10 there is illustrated a simplified flowchart 1000 of an alternative example method for analysing received indications of signal strengths for neighbour cells to determine location characteristics, for example as may be implemented within step 350 of the method of FIG. 3. It is contemplated that the method of FIG. 10, or parts thereof, may be implemented in combination with some or all of the method of FIG. 8, or independently.

The method starts at step 1010, and moves on to step 1020 where expeditious changes in neighbour cell signal strengths measured over a period of time, and particularly characteristic of windows, are identified. In particular for the illustrated example, step 1020 comprises identifying temporary expeditious changes in neighbour cell signal strengths observed over a period of time greater than t (time-to-trigger), for example whereby an expeditious rise or fall in signal strength (observed over a period of time greater than t) is followed by a corresponding fall or rise in signal strength (observed over a period of time greater than t) within a maximum period of time. Alternatively, step 1020 may comprise identifying expeditious changes in neighbour cell signal strengths observed over a period of time greater than t for which concurrent home (femto) cell signal strength are substantially level.

Next, at step 1030, a most distant set (with respect to a home femto AP supporting the home femto cell) of identified expeditious changes in neighbour cell signal strengths characteristic of windows is determined. For example, a distance from the home femto AP may be inferred from a relative signal strength for the home femto cell, whereby a set of expeditious changes in neighbour cell signal strengths may comprise those expeditious increases identified for which concurrent signal strength measurements for the home femto cell are within a configurable range. Furthermore for the illustrated example, a most distant set of changes in neighbour cell signal strength comprising a signal gain/loss greater than x dB (wall loss) are identified.

It is then determined whether the identified set of expeditious changes comprises changes in signal strengths for a number of neighbour cells greater than n (window detection validation), i.e. whether the number of neighbouring cell signals experiencing the expeditious changes is greater than n, at step 1040. If the number of neighbouring cell signals experiencing the expeditious changes within the identified set is greater than n, the method moves on to step 1050 where the detected presence of a window (or the like) is recorded. The method then moves on to step 1060. Referring back to step 1040, if the number of neighbouring cell signals experiencing the expeditious changes within the identified set is not greater than n, the method moves straight on to step 1060.

For the illustrated example, step 1060 comprises determining whether all expeditious changes (or sets of expeditious changes) characteristic of windows comprising a signal gain/loss greater than x dB have been considered. If not all of the expeditious changes identified in step 1020 comprising a signal gain/loss greater than x dB have been considered, the method moves on to step 1070, where a next most distant set of expeditious changes in neighbour cell signals strengths characteristic of windows comprising a signal gain/loss greater than x dB are identified, and the method then loops back to step 1040. Conversely, if all of the expeditious changes comprising a signal gain/loss greater than x dB have been considered, the method moves on to step 1080 and ends.

In some examples, some or all of the steps illustrated in the flowchart may be implemented in hardware and/or some or all of the steps illustrated in the flowchart may be implemented in software. In addition, it is contemplated that one or more of the t (time-to-trigger), x (wall loss) and n (wall/window detection validation) parameters in either or both of the methods of FIGS. 8 and 10 may be user-configurable.

As previously mentioned, for some example embodiments, upon detection of the presence of at least one signal obstruction, a path loss value may be estimated for the femto cell based at least partly on the detection of the presence of the at least one signal obstruction. In particular, it is contemplated that a path loss value for the femto cell may be estimated based on a relative location of the at least one signal obstruction with respect to the femto AP. For example, a path loss value for the femto cell may be estimated for a signal path between the femto AP and, say, a near side or far side of a detected signal obstruction. Such a path loss estimate may be based on, for example, signal strength indications for the femto cell received from wireless communication units that are perceived to be located in the region of, for example, the near side or far side (as appropriate) of the detected signal obstruction.

Where more than one signal obstruction is detected, it is contemplated that a path loss value may be estimated for the femto cell relative to a specific signal obstruction. For example, a path loss value for the femto cell may be estimated relative to a nearest or furthest detected signal obstruction. Alternatively, a path loss value for the femto cell may be estimated relative to an $n^{th}$ nearest or $n^{th}$ furthest detected signal obstruction.

As also previously mentioned, the estimated path loss value for the femto cell may be used to dynamically reconfigured settings for the femto cell. For example, such reconfigured femto cell settings may comprise hand over initiation conditions such as an MAPL setting for the femto cell. In this manner, the effective range of the femto cell may be dynamically reconfigured based on the estimated path loss value by forcing UEs within the femto cell to initiate a hand over when the reconfigured hand over initiation conditions are fulfilled. Additionally/alternatively such reconfigured femto cell settings may comprise transmit power level settings for the femto cell. In this manner, the effective range of the femto cell, and the interference to neighbouring cells caused by the femto cell, may be dynamically adjusted based on the estimated path loss value by increasing/reducing the power with which the femto AP transmits.

Furthermore, such femto cell settings may comprise transmit power level settings for wireless communication units located within the femto cell, and which are transmitted to such wireless communication units by the femto access point. In this manner, the transmit power of wireless communication units located within the femto cell, and thereby interference caused by such wireless communication units to neighbouring cells, may be dynamically configured based on the estimated path loss value.

Thus, the estimated path loss value may be used, by way of example only, to enable femto cell settings to be dynamically configured based on location characteristics such as signal obstructions such that an effective cell range (in terms of transmit power and/or hand over initiation) may be dynamically configured to its environment, for example to be confined within a detected wall or the like without extending beyond such a wall, to only extend a short distance beyond a detected wall or the like, etc.

Although some aspects of the invention have been described with reference to their applicability to a UMTS (Universal Mobile Telecommunication System) cellular communication system and in particular to a UMTS Terrestrial Radio Access Network (UTRAN) of a $3^{rd}$ generation partnership project (3GPP) system, it will be appreciated that the invention is not limited to this particular cellular communication system. It is envisaged that the concept described above may be applied to any other cellular communication system comprising access points for supporting femto cells.

Figure 11:
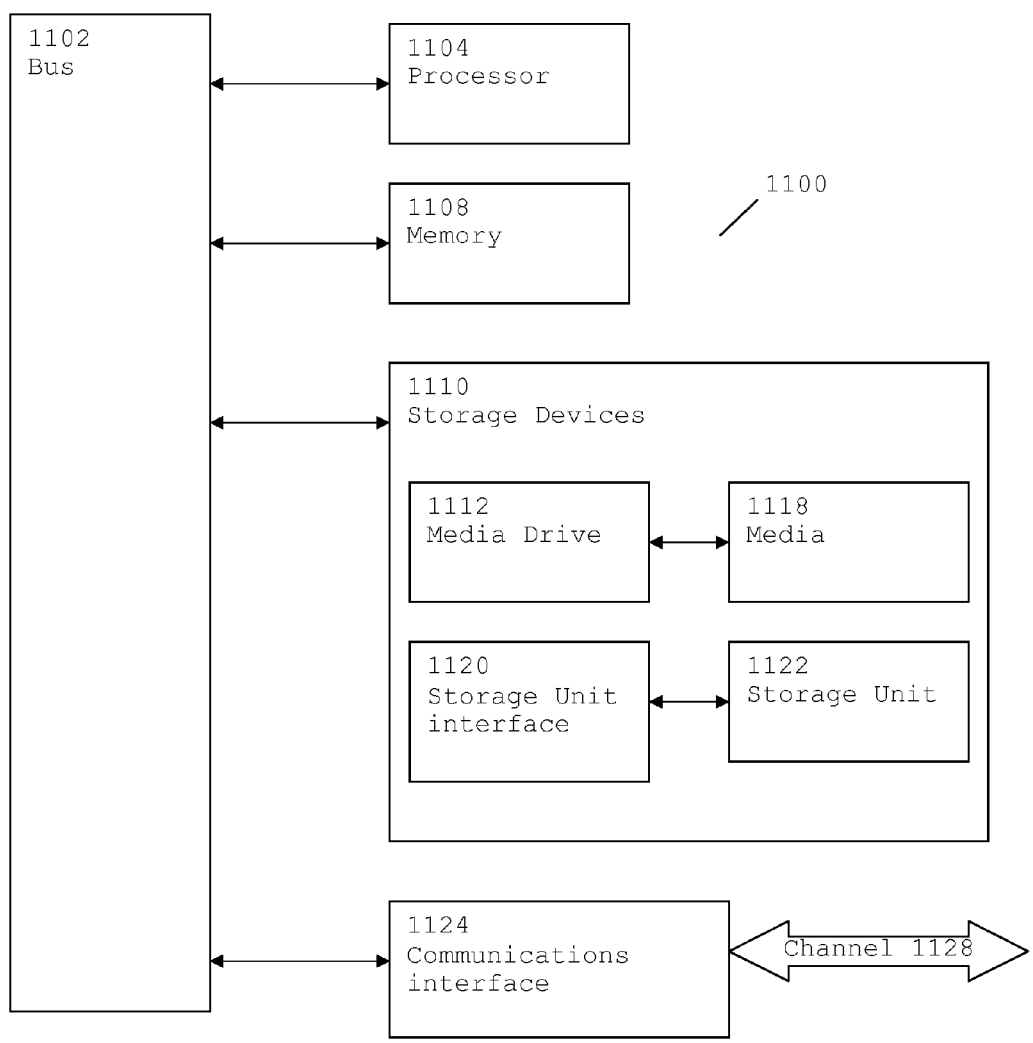
FIG. 11 illustrates a typical computing system that may be employed to implement signal processing functionality in embodiments of the invention.

Referring now to FIG. 11, there is illustrated a typical computing system 1100 that may be employed to implement signal processing functionality in embodiments of the invention. Computing systems of this type may be used in access points and wireless communication units. Those skilled in the relevant art will also recognize how to implement the invention using other computer systems or architectures. Computing system 1100 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 1100 can include one or more processors, such as a processor 1104. Processor 1104 can be implemented using a general or special-purpose processing engine such as, for example, a microprocessor, microcontroller or other control module. In this example, processor 1104 is connected to a bus 1102 or other communications medium.

Computing system 1100 can also include a main memory 1108, such as random access memory (RAM) or other dynamic memory, for storing information and instructions to be executed by processor 1104. Main memory 1108 also may be used for storing temporary variables or other intermediate information during execution of instructions to be executed by processor 1104. Computing system 1100 may likewise include a read only memory (ROM) or other static storage device coupled to bus 1102 for storing static information and instructions for processor 1104.

The computing system 1100 may also include information storage system 1110, which may include, for example, a media drive 1112 and a removable storage interface 1120. The media drive 1112 may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media 1118 may include, for example, a hard disk, floppy disk, magnetic tape, optical disk, CD or DVD, or other fixed or removable medium that is read by and written to by media drive 1112. As these examples illustrate, the storage media 1118 may include a computer-readable storage medium having particular computer software or data stored therein.

In alternative embodiments, information storage system 1110 may include other similar components for allowing computer programs or other instructions or data to be loaded into computing system 1100. Such components may include, for example, a removable storage unit 1122 and an interface 1120, such as a program cartridge and cartridge interface, a removable memory (for example, a flash memory or other removable memory module) and memory slot, and other removable storage units 1122 and interfaces 1120 that allow software and data to be transferred from the removable storage unit 1118 to computing system 1100.

Computing system 1100 can also include a communications interface 1124. Communications interface 1124 can be used to allow software and data to be transferred between computing system 1100 and external devices. Examples of communications interface 1124 can include a modem, a network interface (such as an Ethernet or other NIC card), a communications port (such as for example, a universal serial bus (USB) port), a PCMCIA slot and card, etc. Software and data transferred via communications interface 1124 are in the form of signals which can be electronic, electromagnetic, and optical or other signals capable of being received by communications interface 1124. These signals are provided to communications interface 1124 via a channel 1128. This channel 1128 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms 'computer program product' 'computer-readable medium' and the like may be used generally to refer to media such as, for example, memory 1108, storage device 1118, or storage unit 1122. These and other forms of computer-readable media may store one or more instructions for use by processor 1104, to cause the processor to perform specified operations. Such instructions, generally referred to as 'computer program code' (which may be grouped in the form of computer programs or other groupings), when executed, enable the computing system 1100 to perform functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 1100 using, for example, removable storage drive 1122, drive 1112 or communications interface 1124. The control module (in this example, software instructions or computer program code), when executed by the processor 1104, causes the processor 1104 to perform the functions of the invention as described herein.

It will be appreciated that, for clarity purposes, the above description has described embodiments of the invention with reference to different functional units and processors. However, it will be apparent that any suitable distribution of functionality between different functional units or processors, for example with respect to the beamforming module or beam scanning module, may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors or configurable module components such as FPGA devices. Thus, the elements and components of an embodiment of the invention may be physically, functionally and logically implemented in any suitable way. Indeed, the functionality may be implemented in a single unit, in a plurality of units or as part of other functional units.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

Thus, a method and apparatus for enabling the dynamic configuration of femto cell parameters based on characteristics of a location of the femto access point supporting the femto cell, and an access point adapted therefor, have been described, wherein the aforementioned disadvantages with prior art arrangements have been substantially alleviated.

The invention claimed is:

1. A method for estimating a path loss value for a femto cell, the method comprising, at a femto access point of the femto cell:
   detecting a presence of at least one signal obstruction and estimating the path loss value for the femto cell relative to the at least one detected signal obstruction, the step of detecting the presence of at least one signal obstruction including:
   receiving a plurality of indications of signal strength for at least one neighbour cell and a home cell from at least one wireless communication unit;
   analysing the received plurality of indications of signal strength for the at least one neighbour cell and the home cell by
   (i) identifying one or more expeditious changes in neighbour cell signal strength; and
   (ii) determining an extent of at least one concurrent identified change in neighbour cell signal strength relative to the home cell signal strength indication,
   wherein analysing the received plurality of indications of signal strength comprises:
   identifying whether one or more expeditious changes in neighbour cell signal strength observed over a period of time >t for which at least one opposing concurrent change in home cell signal strength exists;
   determining whether the extent of at least one concurrent change in neighbour cell signal strength comprising signal gain/loss >x;
   determining whether the number of neighbour cells experiencing the at least one change >n; and
   if a number of neighbour cells experiencing the at least one change >n, identifying the presence of a signal obstruction.

2. The method of claim 1 wherein analysing the received plurality of indications of signal strength comprises; identifying whether one or more expeditious temporary increases in neighbour cell signal strength observed over a period of time >t;
   determining whether the extent of at least one concurrent increase in neighbour cell signal strength comprising signal gain >x;
   determining whether the number of neighbour cells experiencing the increase >n; and
   if the number of neighbour cells experiencing the increase >n, identifying the presence of a signal obstruction.

3. The method of claim 2 wherein at least one of t, x and n comprises a configurable parameter.

4. The method of claim 1 wherein at least one of t, x and n comprises a configurable parameter.

5. The method of claim 1 herein upon detection of the presence of a plurality of signal obstructions, the method comprises estimating the path loss value for the femto cell relative to at least one from a group consisting of:
   (i) a furthest detected signal obstruction;
   (ii) a nearest detected signal obstruction;
   (iii) an $n^{th}$ furthest detected signal obstruction; and
   (iv) an $n^{th}$ nearest detected signal obstruction.

6. The method of claim 1 wherein the at least one neighbour cell is a macro cell.

7. The method of claim 1 comprising instructing at least one wireless communication unit located within the femto cell to report at least one signal strength measurement for at least one neighbour cell.

8. The method of claim 1 wherein comprising reconfiguring a Maximum Allowable Path Loss (MAPL) parameter for the femto cell based at least partly on the estimated path loss value.

9. The method of claim 1 comprising reconfiguring a transmit power level for the femto access point based at least partly on the estimated path loss value.

10. The method of claim 1 comprising reconfiguring a transmit power level of at least one wireless communication unit located within the femto cell based at least partly on the estimated path loss value.

11. The method of claim 1 wherein the femto access point is arranged to support a femto cell within a Universal Mobile Telecommunications System (UMTS) cellular network.

12. An access point for supporting communication in a femto cell of a cellular communication network, the access point comprising transceiver circuitry arranged to enable communication with at least one wireless communication unit located within the femto cell, and a signal processing module arranged to configure a transmission of data over a communication channel to/from a wireless communication unit within the femto cell, the signal processing module being arranged to:
   detect a presence of at least one signal obstruction and estimate a path loss value for the femto cell relative to the at least one detected signal obstruction by; receiving a plurality of indications of signal strength for at least one neighbour cell and a home cell from at least one wireless communication unit;
   analysing the plurality of indications of signal strength for the at least one neighbour cell and the home cell by identifying one or more expeditious changes in neighbour cell strength and determining an extent of at least one concurrent identified change in neighbour cell signal strength relative to a home cell signal strength indication, wherein analysing the plurality of indications of signal strength comprises; identifying whether one or more expeditious changes in neighbour cell signal strength observed over a period of time >t for which at least one opposing concurrent change in home cell signal strength exists;
   determining whether the extent of at least one concurrent change in neighbour cell signal strength comprising signal gain/loss >x;
   determining whether the number of neighbour cells experiencing the at least one change >n; and
   if a number of neighbour cells experiencing the at least one change >n, identifying the presence of a signal obstruction.

13. A communication system comprising an access point for supporting communication in a femto cell of a cellular communication network, the access point comprising transceiver circuitry arranged to enable communication with at least one wireless communication unit located within the femto cell, and a signal processing module arranged to configure a transmission of data over a communication channel to/from a wireless communication unit within the femto cell, the signal processing module being arranged to:
   detect a presence of at least one signal obstruction and estimate a path loss value for the femto cell relative to the at least one detected signal obstruction by
   receiving a plurality of indications of signal strength for at least one neighbour cell and a home cell from at least one wireless communication unit;
   analysing the plurality of received indications of signal strength for the at least one neighbour cell and the home cell by identifying one or more expeditious changes in neighbour cell strength and determining an extent of at least one concurrent identified change in neighbour cell signal strength relative to a home cell signal strength indication, wherein analysing the plurality of received indications of signal strength comprises; identifying whether one or more expeditious changes in neighbour cell signal strength observed over a period of time >t for which at least one opposing concurrent change in home cell signal strength exists;

determining whether the extent of at least one concurrent change in neighbour cell signal strength comprising signal gain/loss >x;

determining whether the number of neighbour cells experiencing the at least one change >n; and if a number of neighbour cells experiencing the at least one change >n, identifying the presence of a signal obstruction.

14. An integrated circuit for an access point for supporting communication in a femto cell of a cellular communication network, the access point comprising transceiver circuitry arranged to enable communication with at least one wireless communication unit located within the femto cell, wherein the integrated circuit comprises a signal processing module arranged to configure a transmission of data over a communication channel to/from a wireless communication unit within the femto cell, the signal processing module being arranged to: detect a presence of at least one signal obstruction and estimate a path loss value for the femto cell relative to the at least one detected signal obstruction by;

receiving a plurality of indications of signal strength for at least one neighbour cell and a home cell from at least one wireless communication unit;

analysing the plurality of received indications of signal strength for the at least one neighbour cell and home cell by identifying one or more expeditious changes in neighbour cell strength and determining an extent of at least one concurrent identified change in the neighbour cell signal strength relative to a home cell signal strength indication, wherein analysing the plurality of received indications of signal strength comprises; identifying whether one or more expeditious changes in neighbour cell signal strength observed over a period of time >t for which at least one opposing concurrent change in home cell signal strength exists;

determining whether the extent of at least one concurrent change in neighbour cell signal strength comprising signal gain/loss >x;

determining whether the number of neighbour cells experiencing the at least one change >n; and if a number of neighbour cells experiencing the at least one change >n, identifying the presence of a signal obstruction.

15. A non-transitory computer-readable medium having computer readable instructions thereon for execution by a processor to perform a method for estimating a path loss value for a femto cell, the code operable for, at a femto access point of the femto cell: detecting a presence of at least one signal obstruction and estimating a path loss value for the femto cell relative to the at least one detected signal obstruction by;

receiving a plurality of indications of signal strength for at least one neighbour cell and a home cell from at least one wireless communication unit;

analysing the plurality of received indications of signal strength for the at least one neighbour cell and the home cell by identifying one or more expeditious changes in neighbour cell strength and determining an extent, of at least one concurrent identified change in neighbour cell signal strength relative to a home cell signal strength indication, wherein analysing the plurality of received indications of signal strength comprises; identifying whether one or more expeditious changes in neighbour cell signal strength observed over a period of time >t for which at least one opposing concurrent change in home cell signal strength exists;

determining whether the extent of at least one concurrent change in neighbour cell signal strength comprising signal gain/loss >x;

determining whether the number of neighbour cells experiencing the at least one change >n; and if a number of neighbour cells experiencing the at least one change >n, identifying the presence of a signal obstruction.

16. The non-transitory computer readable medium of claim 15 comprising at least one of :the group consisting of a hard disk, a CD-ROM, an optical storage device, a magnetic storage device, a Read Only Memory, ROM, a Programmable Read Only Memory, PROM, an Erasable Programmable Read Only Memory, EPROM, an Electrically Erasable Programmable Read Only Memory, EEPROM, and a Flash memory.

* * * * *

UNITED STATES PATENT AND TRADEMARK OFFICE
CERTIFICATE OF CORRECTION

| | |
|---|---|
| PATENT NO. | : 9,125,099 B2 |
| APPLICATION NO. | : 13/581565 |
| DATED | : September 1, 2015 |
| INVENTOR(S) | : Akhilesh Pokhariyal |

It is certified that error appears in the above-identified patent and that said Letters Patent is hereby corrected as shown below:

TITLE PAGE:

In the Abstract; Item (57) Column 2, Line 6; Delete "neighbo" and insert -- neighbor --, therefor;

SPECIFICATION:

Column 1, Line 11; Delete "Mar.2010" and insert -- Mar. 2010 --, therefor;

CLAIMS:

Column 17, Line 53, claim 5; Delete "herein" and insert -- wherein --, therefor; and Column 20, Line 40, claim 16; Delete "of :the" and insert -- of: the --, therefor.

Signed and Sealed this
Twenty-second Day of March, 2016

Michelle K. Lee
*Director of the United States Patent and Trademark Office*